June 10, 1958   H. W. HANSEN   2,837,887
ROTARY LAWN MOWER BLADE
Filed May 3, 1957

INVENTOR.
Henry W Hansen
BY
Ralph Hammar
Attorney

# United States Patent Office 2,837,887
Patented June 10, 1958

2,837,887

ROTARY LAWN MOWER BLADE

Henry W. Hansen, Riverdale, Md., assignor to Lord Manufacturing Company, Erie, Pa., a corporation of Pennsylvania Application May 3, 1957, Serial No. 656,908

4 Claims. (Cl. 56—295)

This invention is a rotary lawn mower having flexible rubber spokes carrying metal blades at the outer ends of the spokes so that the blades can be deflected by stones or similar obstructions. The deflection may be twisting of the rubber spokes or the spokes may bend in any direction transverse to the length. Centrifugal force normally holds the blades in cutting position and cables or similar flexible but non-stretchable members embedded in the rubber spokes prevent stretching of the rubber but do not interfere with the flexibility needed for deflection of the blades upon encountering obstructions.

Figure 1:
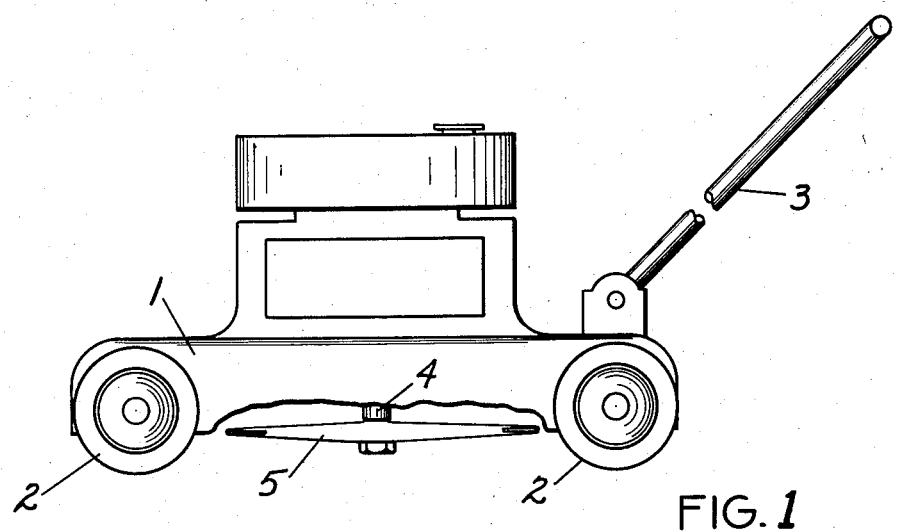
Figure 2:
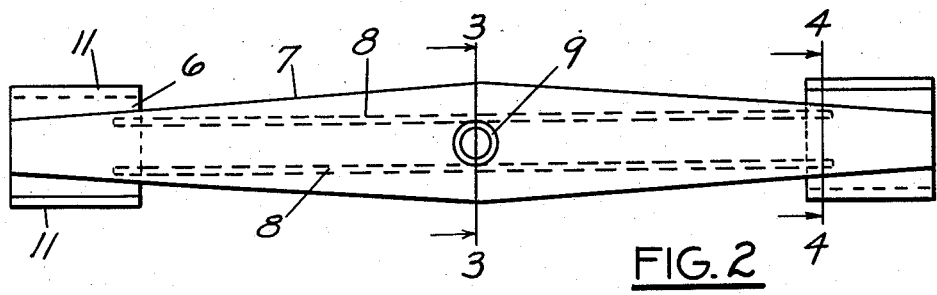
Figure 3:
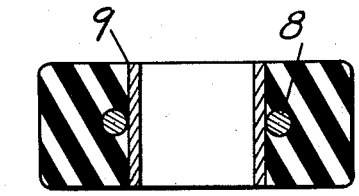
Figure 4:
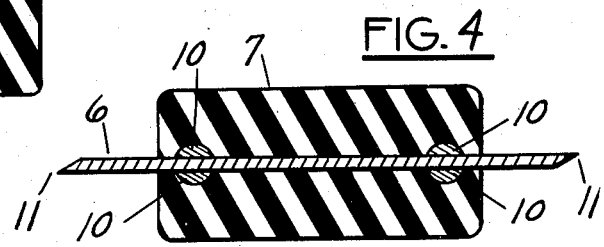

In the accompanying drawing Fig. 1 is a side elevation partly broken away diagrammatically showing a rotary lawn mower, Fig. 2 is an enlarged plan view of the lawn mower blade, Fig. 3 is an enlarged section of line 3—3 of Fig. 2, and Fig. 4 is an enlarged section of line 4—4 of Fig. 2.

As diagrammatically shown in Fig. 1 the mower has a housing or frame 1 supported by wheels 2 and guided by a handle 3. Within the housing is a suitable motor driving a vertical power shaft 4 to which is fixed the lawn mower blade 5. In the usual construction, the blade 5 is made of flat steel and is effectively rigid so that stones or other articles likely to be dropped on the lawn can be thrown substantial distances upon being struck by the blades. Rotary mowers of this general design are in common use and are made in a wide variety of sizes and shapes which may differ substantially in appearance from the diagrammatic illustration of Fig. 1.

In the present construction, the disadvantages of the rigid metal blade are overcome by having the blades 6 embedded in and bonded to the outer ends of flexible rubber spokes 7. The blades are in pairs diametrically opposite each other and are connected by flexible metallic cables 8 on opposite sides of the center line of the spokes. The cables 8 extend on opposite sides of a metal hub 9. The ends of the cable are split as shown in Fig. 4 and are soldered or tack welded to the blades as indicated at 10. The metal hub 9 and the cables 8 are embedded in and bonded to the rubber.

The rubber spokes are stiff enough to be self sustaining but are flexible enough to yield either by twisting or by transverse deflection whenever one of the metal blades 6 encounters an obstruction. During operation, the centrifugal force on the metal blades 6 is sufficient to hold tthe blades in the outermost position ready for cutting. Because the blades rotate at high speed, centrifugal force is substantial and would stretch the rubber spokes 7 if it were not for the embedded metal cables 8 which resist the stretching due to centrifugal force without interfering with the lateral or twisting flexibility of the spokes.

In the use of the cutter, the blades 6 have the same cutting action as the rigid metal blades but are safer because they can be deflected by obstructions such as the small stones or other objects likely to be dropped on the lawn. The ability to deflect cuts down the danger due to flying stones and also protects the cutting blades 6 from damage. When one of the cutting edges 11 of the blades becomes dull, the other cutting edge can be brought into cutting position by merely turning the blade over.

Even if the blades 6 should encounter a very substantial obstruction sufficient to put a permanent set in a rigid steel blade, the rubber spoke can deflect enough to accommodate the deflecting force and immediately return to the normal position as soon as the blades move out of contact with the obstruction. The flexible rubber spokes accordingly increase the life of the blades as well as increasing the safety.

What is claimed as new is:

1. In a rotary lawn mower of the type having a depending vertical power shaft, a hub fixed to the shaft, a pair of diametrically aligned flexible rubber spokes fixed to the hub and projecting from opposite sides of the hub, metal blades fixed in the outer ends of the spokes, said blades being normally held in cutting relation by centrifugal force and said spokes being stiff enough to be self sustaining but flexible enough to yield whenever one of the blades encounters an obstruction, and flexible but non-stretchable members embedded in the rubber spokes and connected to the blades for preventing stretching of the spokes and the consequent radially outward movement of the blades under centrifugal force.

2. In a rotary lawn mower of the type having a depending vertical power shaft, a hub fixed to the shaft, a pair of diametrically aligned flexible rubber spokes fixed to the hub and projecting from opposite sides of the hub, metal blades fixed in the outer ends of the spokes, said blades being normally held in cutting relation by centrifugal force and said spokes being stiff enough to be self sustaining but flexible enough to yield whenever one of the blades encounters an obstruction, and a pair of flexible but non-stretchable members embedded in the rubber spokes on opposite sides of the hub and extending between the blades with opposite ends of the members anchored to the blades for preventing stretching of the spokes and the consequent radially outward movement of the blades under centrifugal force.

3. In a rotary lawn mower of the type having a depending vertical power shaft, a radially extending flexible rubber spoke fixed to the shaft, a metal blade fixed in the outer end of the spoke, said blade being normally held in cutting relation by centrifugal force and said spoke being stiff enough to be self sustaining but flexible enough to yield whenever the blade encounters an obstruction, and means including a flexible but non-stretchable tension member embedded in the rubber spoke and connected to the blade for preventing stretching of the spoke and the consequent radially outward movement of the blade under centrifugal force.

4. In a rotary lawn mower of the type having a depending vertical power shaft, a hub fixed to the shaft, a pair of diametrically aligned flexible rubber spokes secured to the hub and projecting radially from opposite sides of the hub, flat metal blades secured in the outer ends of the spokes in the plane of the spokes, said blades being held in cutting relation by centrifugal force and said spokes being stiff enough to be self sustaining but flexible enough to yield whenever one of the blades encounters an obstruction, and a pair of generally parallel flexible but non-stretchable cables embedded in the rubber spokes and extending between the blades on opposite sides of the hub, the ends of the cables being anchored to the blades whereby the cables serve as tension members preventing radially outward movement of the blades under centrifugal force.

References Cited in the file of this patent

UNITED STATES PATENTS

| | | |
|---|---|---|
| 898,256 | Olson | Sept. 8, 1908 |
| 1,441,141 | Andrews | Jan. 2, 1923 |
| 2,427,265 | Dreischerf | Sept. 9, 1947 |
| 2,492,600 | Stauffer | Dec. 27, 1949 |
| 2,608,816 | Lembke | Sept. 2, 1952 |
| 2,740,249 | Stearns | Apr. 3, 1956 |